Jan. 11, 1949.  T. F. HEALY  2,458,593
SAFETY MOUNTING FOR LENSES
Filed May 31, 1944
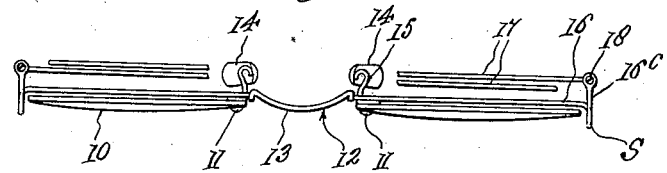
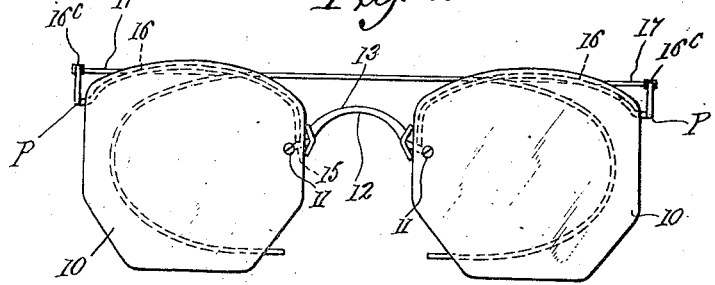
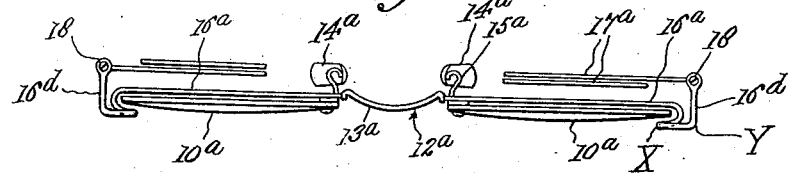
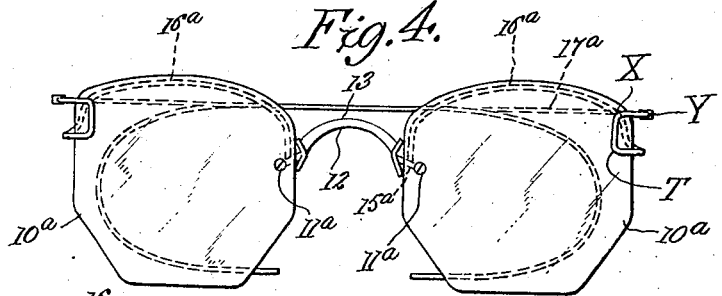
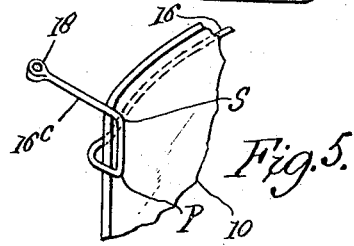
Inventor
Thomas F. Healy
Attorney Patented Jan. 11, 1949

2,458,593

UNITED STATES PATENT OFFICE 2,458,593

SAFETY MOUNTING FOR LENSES

Thomas F. Healy, Washington, D. C., assignor to Saf-Mont, Inc., Washington, D. C., a corporation of Delaware Application May 31, 1944, Serial No. 538,136

2 Claims. (Cl. 88—41)

The present invention relates to a safety mounting for lenses, and a method of making the same, and more particularly to a safety mounting for drilled ophthalmic lenses of the type ordinarily employed in rimless spectacles.

The primary object of this invention is to provide a safety mounting which, in combination with two aligned drilled lenses, results in a protective structure for the lenses.

Another object is to provide a temple-supporting member for a spectacle mounting, wherein the said member is bent at points intermediate the ends thereof to provide two spaced apart portions which are substantially parallel, the one to the other.

Another object is to provide a method of bending a temple-supporting member intermediate the ends thereof in a plurality of places preferably at substantially right angles, so that a protective frame results when the mounting is used in combination with lenses.

A further object is to provide an inexpensive and simple mounting for lenses in which the temple-supporting members thereof follow the contours of the upper edges of the lenses in such a manner that there will be a minimum restriction of vision due to the mounting.

Another object is to provide a mounting for lenses having crimped portions in the temple-supporting wires intermediate the ends thereof; and said crimped portions serving to protect the lenses from easy breakage.

Still another object is to provide crimped temple-supporting wires in a mounting assembly for drilled spectacle lenses in such a combined relationship that the crimped portions of the said temple-supporting wires will preferably first engage any flat surface upon which the mounted lenses are horizontally disposed with convex surfaces downward, and whereas each of said temple supporting wires is free to flex to absorb jolts which would normally strike said lenses.

Another object is to provide a safety mounting assembly for spectacle lenses of such structure that the lenses are more completely protected against breakage when the spectacles are disposed in the ordinary spectacle container now employed in the art.

The broad concept of this invention embraces the feature of crimping the temple-supporting members of the safety spectacle mounting in such a manner that the spectacle lenses are protected against jolts normally causing breakage.

More specifically, this invention embraces a safety mounting for two spaced aligned spectacles lenses each having only one drilled hole, and includes a central lens supporting means consisting of a central bridge portion to fit over the nose, guard means adapted to fit on the sides of the nose and strap means, one anchored to each lens. The two lenses are secured together through the central lens supporting means, which per se, does not constitute a part of this invention. Relatively long and slender temple supporting wires preferably of a flexible nature, are each secured at one end thereof to said central lens supporting means. Each of said temple supporting wires preferably follows the contour of the top of its corresponding lens and extends across either the convex or concave face thereof. The outer end portion of each of said temple supporting wires is bent around the edge of its corresponding lens, preferably in spaced apart relation thereto, and thence backward upon itself to form a crimped portion. Each of said temple supporting wires engages a temple member beyond said crimped portion, preferably on the concave side of the corresponding lens.

Another object is to provide a safety mounting which in combination with spectacle lenses creates a high bow, wherein the temple members are above the line of sideward vision.

Further objects and advantages of the invention will be apparent from the following description thereof and from the claims appended thereto.

In the drawing, in which two forms of my invention are shown, and wherein like numerals refer to like of corresponding parts throughout the several views:

Figure 1 is a top plan of the safety mounting for spectacles and embodies the invention, Figure 2 is a front elevation of the mounting, shown in Figure 1.

Figure 3 is a top plan view of a modified form of the invention wherein the temple-supporting wires extend across the convex surfaces of the lenses of the mounting assembly.

Figure 4 is a front elevation of the mounting shown in Figure 3.

Figure 5 is an enlarged fragmentary detail showing the curvature of the temple supporting member in the form of Figure 1, and Figure 6 is an enlarged fragmentary detail showing the curvature of the temple supporting member in the form of Figure 3.

Referring now to the drawing, and more particularly to Figures 1 and 2, the numeral 10 indicates an ophthalmic lens preferably drilled at only one point, as 11. Inasmuch as the structure of mounting is identical relative to both lenses, the description thereof will be limited to only one lens.

The numeral 12 generally indicates a lens supporting means for holding the lenses in spaced alignment and in secured together relationship. The central lens supporting means 12 consists of a central bridge portion 13 adapted to fit over the nose of the person wearing the spectacles, guard means 14 adapted to fit on the sides of the nose and strap means 15, anchored to the lens 10 at the hole 11 in any suitable conventional manner. The lens supporting means 12 does not per se constitute a part of this invention. Any suitable means known in the art for securing together spectacle lenses can be employed in the practice of the invention.

A temple-supporting wire 16 is secured to the lens supporting means 12 in any suitable manner as by soldering. Said wire 16 preferably follows the contour of the upper edged portion of the lens 10 and extends beyond the edge of said lens 10 at a point remote from the lens supporting means 12.

The wire 16 is bent around the outer peripheral edge of the lens 10 and extends forwardly to a point P, where it is bent vertically, extending to a point S and then back upon itself to form portion 16c for engagement with the temple member 17 at the pivot point 18. The wire portion P—S of the wire 16 is substantially flat and parallel to the plane of the lens and is in such a relationship to the convex side of the lens 10 that this portion will preferably first engage a flat surface when the spectacles are horizontally disposed so as to permit a flexing of the wire 16 to absorb any frontwise jolts. Edgewise jolts are absorbed by the flexing of portions 16c of the wire 16.

The safety mounting of the invention absorbs shocks from an edgewise and frontwise direction. Also the spectacles lenses can be placed with convex faces downward and because the wire portion P—S is preferably forward of the most forward portion of the convex sides of the lenses, there is no scratching of the convex faces of the lenses when the spectacles are disposed with the convex faces of the lenses downward.

The structure of the modified form of the invention shown in Figures 3 and 4 is somewhat similar to the preferred form of the invention. The numeral 10a indicates an ophthalmic lens drilled at 11a. The numeral 12a generally indicates the central lens supporting means which consists of a central bridge portion 13a, nose guard menas 14a and strap means 15a.

The temple supporting wire 16a is secured to the lens supporting means 12a behind the lens 10a, or on the concave side thereof. Wire 16a extends across the concave face of lens 10a, following the contour of the upper edge of said lens.

The wire member 16a then extends around the edge of the lens 10a and forwardly to a point Q. Then the wire 16a is bent inwardly across a small portion of the convex side of the lens 10a to a point T and then upwardly to a point X, and then bent outwardly to a point Y whence it is bent backward to form portion 16d which attaches to temple member 17a at the pivot point 18a, preferably on the concave side of lens 10a.

The wire portion T—X of wire 16a is preferably disposed with relation to the convex side of the lens 10a so that the portion T—X will first engage a flat surface when the spectacle lenses are horizontally disposed with convex faces downward. Wire portion T—X is preferably spaced from lens 10a so as to permit flexing of the wire 16a without any portion thereof contacting said lens to thus absorb shock. It is not necessary to space wire portion T—X from the lens 10a as the wire portion furnishes a means of protecting the lens.

The safety mountings of this invention afford multiple protection to lenses. In the preferred forms of the mountings, where the temple supporting wire is free to flex backwardly without contacting the lens, there is afforded superior protection to the lens in a rimless mounting.

Although the temple-supporting wires are illustrated as being of substantially circular cross-sectional shape, it is to be understood that the said wires may be formed triangular, square, rectangular, or in any other desired cross-sectional shape. If desired, other flexible materials, such as plastics, may be employed for the temple-supporting members.

It is understood that many shapes of lenses may be employed. The mounting may be integral, or of separate parts joined together to provide a unitary structure.

The inventive concept is the structure of the temple-supporting member with relation to the lens. All other parts may be conventional.

The form of the invention shown in Figures 1, 2 and 5 teaches a mounting wherein a temple-supporting member which preferably follows the contour of the upper concave portion of a lens. Said temple-supporting member being bent at substantially a right angle around the outer peripheral edge of the lens, and extending forwardly in a direction substantially transverse the vertical plane of the lens to a point preferably beyond the foremost point on the convex surface of the lens, and thence being bent and extending substantially perpendicularly or at right angles to said point to another point to form a surface between the points which is substantially parallel to the lens, and said wire thence being bent at a right angle and extending rearwardly to a point behind the lens, or on the concave side thereof.

The form of the invention shown in Figures 3, 4 and 6 teaches a mounting wherein the temple-supporting member is bent around the outer peripheral edge of a lens, extending forwardly of the convex side of the lens, and thence being bent at substantially a right angle and extending to point overlying the convex face of the lens, and thence being bent at substantially a right angle and extending to another point preferably overlying the face of the lens, and thence being bent at substantially a right angle and extending beyond the outer peripheral edge of the lens, and thence being bent again at substantially a right angle and extending rearwardly to the concave side of the lens for attachment to a temple member.

Reference is made to applicant's copending application, Serial No. 514,527, filed December 16, 1943, for subject matter similar to the matter described in the present application.

Various modifications of this invention will be apparent to those skilled in the art without departing from the spirit of this invention, and it is intended to be limited only by the scope of the appended claims.

What I claim as my invention:

1. Safety spectacles comprising, in combination, a pair of temple members, a pair of lenses, means to secure said lenses together, a pair of temple-supporting members each associated with one of said lenses, each of said temple-supporting members substantially following the contour of the top portion of its corresponding lens, each of said temple-supporting members being bent forwardly around the outer peripheral edge of its corresponding lens and thence inwardly across a portion of said lens, thence perpendicularly, and thence outwardly beyond the edge of lens and thence rearwardly, each of said temple-supporting members being connected at one end thereof to said first mentioned means, and each of said temple-supporting members being connected at the other end thereof to its corresponding temple member.

2. Safety spectacles comprising, in combination, a pair of temple members, a pair of lenses each having convex and concave faces, means to secure said lenses together, a pair of flexible temple-supporting members each associated with one of said lenses, each of said temple-supporting member substantially following the contour of the top portion of its corresponding lens, each of said temple-supporting members being bent forwardly beyond the edge of its corresponding lens and thence being bent inwardly across a portion of said lens, thence perpendicularly, thence outwardly beyond the edge of the said lens, thence rearwardly to form a substantially flat portion forwardly of the lens, said flat portion being spaced from its corresponding lens so that it first engages a flat surface when the spectacles are horizontally disposed thereon with the convex surfaces of the lenses downward, each of said temple-supporting members being connected at one end thereof to said first mentioned means, and each of said temple-supporting members being connected at the other end thereof to its corresponding temple member.

THOMAS F. HEALY.

REFERENCES CITED

The following references are of record in the file of this patent:

UNITED STATES PATENTS

| Number | Name | Date |
|---|---|---|
| 1,177,189 | King | Mar. 28, 1916 |
| 1,992,260 | Thomson | Dec. 26, 1935 |
| 2,223,646 | Splaine | Dec. 3, 1940 |
| 2,257,811 | Pomeranz et al. | Oct. 7, 1941 |